United States Patent
Asuri et al.

(10) Patent No.: US 11,558,337 B1
(45) Date of Patent: Jan. 17, 2023

(54) ACTIVITY-BASED MESSAGE MANAGEMENT

(71) Applicant: International Business Machines Corporation, Armonk, NY (US)

(72) Inventors: Sheetal Kalyani Asuri, Hyderabad (IN); Pallavi Koganti, Secunderabad (IN); Venu Muriki, Hyderabad (IN); Supraja Kakarlapudi, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/546,399

(22) Filed: Dec. 9, 2021

(51) Int. Cl.
*H04L 51/226* (2022.01)
*H04L 51/224* (2022.01)

(52) U.S. Cl.
CPC .......... *H04L 51/224* (2022.05); *H04L 51/226* (2022.05)

(58) Field of Classification Search
CPC ............................ H04L 51/224; H04L 51/226
See application file for complete search history.

(56) References Cited

U.S. PATENT DOCUMENTS

| | | | |
|---|---|---|---|
| 8,135,779 | B2 | 3/2012 | Rainisto |
| 9,300,616 | B1 | 3/2016 | Huston |
| 10,397,161 | B2 | 8/2019 | Brisebois |
| 2013/0191476 | A1 | 7/2013 | Backholm |

OTHER PUBLICATIONS

Mell et al., "The NIST Definition of Cloud Computing", Recommendations of the National Institute of Standards and Technology, Special Publication 800-145, Sep. 2011, 7 pages.
Phadke, Swapna Gautam, "Email Classification Using a Self-Learning Technique Based On User Preferences", A Paper Submitted to the Graduate Faculty of the North Dakota State University of Agriculture and Applied Science, In Partial Fulfillment of the Requirements for the Degree of Master of Science, Oct. 2015, 55 pages.

*Primary Examiner* — Ryan J Jakovac
(74) *Attorney, Agent, or Firm* — Stosch Sabo

(57) ABSTRACT

A method can include obtaining a limit value. The limit value can correspond to a number of times an email account having a set of email messages is accessed. The method can further include identifying a first email message of the set of email messages. The first email message can have an unread status. The method can further include obtaining, for the first email message, a count of one or more sessions. The first email message can have the unread status both during the one or more sessions and after the one or more sessions. The method can further include comparing the limit value to the count. The method can further include determining, based on the comparing, that a threshold is met. The method can further include modifying the first email message in response to the determining that the threshold is met.

20 Claims, 5 Drawing Sheets

ACTIVITY-BASED MESSAGE MANAGEMENT

BACKGROUND

The present disclosure relates to message management, and more specifically, to management of email messages.

Email clients can be used to view, send, receive, and organize email messages. Such email clients can include features to assist users with such tasks.

SUMMARY

According to embodiments of the present disclosure, a method can include obtaining a limit value. The limit value can correspond to a number of times an email account is accessed. The email account can comprise a set of email messages. The method can further include identifying a first email message of the set of email messages. The first email message can have an unread status. The method can further include obtaining, for the first email message, a first count of one or more first sessions. The first email message can have the unread status both during the one or more first sessions and after the one or more first sessions. The method can further include comparing the limit value to the first count. The method can further include determining, based on the comparing, that a threshold is met. The method can further include modifying the first email message in response to the determining that the threshold is met.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
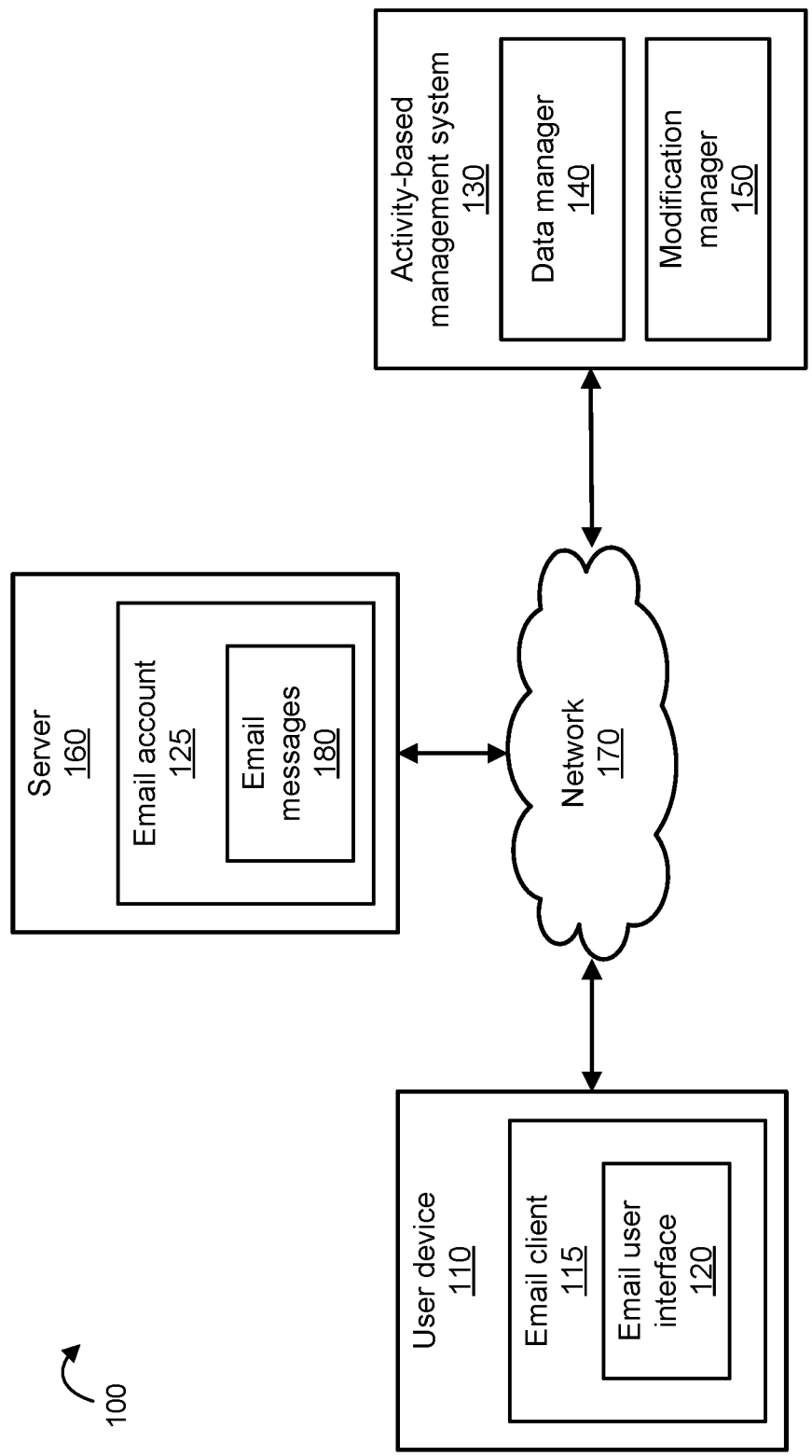
FIG. 1 depicts an example computing environment having an activity-based management system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to message management; more particular aspects relate to activity-based management of email messages. While the present disclosure is not necessarily limited to such applications, various aspects of the disclosure may be appreciated through a discussion of various examples using this context.

Email messages are frequently transmitted for a wide range of business and non-business purposes. For example, email messages can be used to share digital photos and videos, transmit electronic documents, send and receive flight itineraries, share electronic invitations, receive notifications of sales and discounts, obtain electronic sales receipts and confirmations, receive tracking updates for online purchases, receive authentication codes to access websites, etc. Email accounts can often be accessed at any time from virtually any networked computing device, including mobile phones and wearable computing devices, such as smart watches. Additionally, users can have multiple email accounts whose messages can be consolidated into a single user interface.

Email's broad utility, accessibility, portability, and ease of use for mass marketing can contribute to users accumulating large quantities of email messages in mailboxes of their email accounts. Such large quantities of email messages can result in a cumbersome display by an email user interface, as previously received email messages can be difficult to distinguish among a multitude of read and unread email messages. Furthermore, performing a keyword search for a sought email message within a mailbox having a myriad of email messages can be of limited benefit due to a large number of search results that can be generated. Additionally, maintaining a multitude of email messages can burden computing networks and consume significant storage capacity and power, which can detrimentally affect the environment. Furthermore, in view of the fact that computing networks can support billions of email accounts, each account potentially including thousands of accumulated email messages, the detrimental effects of such accumulated email messages can be of heightened concern.

To address these and other challenges, embodiments of the present disclosure include an activity-based management system (ABMS). In some embodiments, the ABMS can modify a set of unread email messages based on a user's activity with an email account containing such messages. More specifically, in some embodiments, the ABMS can delete a set of unread email messages based on a number of times a user concludes an email session without reading such emails. In some embodiments, the ABMS can modify a set of unread email messages according to user-selected criteria. Accordingly, embodiments of the present disclosure can efficiently increase a storage capacity of a plurality computing devices. Furthermore, embodiments of the present disclosure can facilitate improved display and functionality of email user interfaces. Finally, embodiments of the present disclosure can facilitate improved performance and efficiency of computing networks associated with email accounts.

Turning to the figures, FIG. 1 illustrates a computing environment 100 that includes one or more of each of an ABMS 130, a server 160, a user device 110, and/or a network 170. In some embodiments, at least one ABMS 130, user device 110, and/or server 160 can exchange data with at least one other through the at least one network 170. One or more of each of the ABMS 130, user device 110, server 160, and/or network 170 can include a computer system, such as the computer system 301 discussed with respect to FIG. 3.

In some embodiments, the ABMS 130 can be included in software installed on a computer system of at least one of the user device 110 and/or server 160. For example, in some embodiments, the ABMS 130 can be included as a plug-in software component of software (e.g., email client 115) installed on the user device 110. The ABMS 130 can include program instructions implemented by a processor, such as a processor of server 160, to perform one or more operations discussed with respect to FIG. 2.

In some embodiments, the ABMS 130 can include one or more modules, such as data manager 140 and/or modification manager 150. In some embodiments, data manager 140 and modification manager 150 can be integrated into a single module. In some embodiments, data manager 140 can obtain and/or store data. In some embodiments, modification manager 150 can analyze data, store data, and/or generate notifications. In some embodiments, ABMS 130 can store data (e.g., metadata) to one or more servers 160 and/or one or more user devices 110. In some embodiments, data manager 140 and/or modification manager 150 can include program instructions implemented by a processor, such as a processor of server 160, to perform one or more operations discussed with respect to FIG. 2. For example, in some embodiments, data manager 140 can include program instructions to perform operations 205, 210, 215, and 230, FIG. 2. In some embodiments, modification manager 150 can include program instructions to perform operations 220, 225, and 235, FIG. 2. ABMS 130 can autonomously perform operations discussed with respect to FIG. 2; thus, ABMS 130 can efficiently and accurately perform method 200 on a plurality of servers, each server having large quantities of email accounts, each email account having a multitude of email messages.

In some embodiments, the one or more user devices 110 can include a device such as a notebook computer, tablet, mobile phone, desktop computer, and the like. User device 110 can include an email client 115, such as an email application or program. Email client 115 can include an email user interface 120 that can be displayed on the user device 110. For example, email user interface 120 can include a graphical user interface that can display a list of email messages 180 of a corresponding email account 125. In some embodiments, email user interface 120 can display one or more notifications received from ABMS 130. In some embodiments, user device 110 can store one or more email messages 180 obtained from server 160 through network 170.

In some embodiments, the one or more servers 160 can include one or more web servers. In some embodiments, the one or more servers 160 can include a plurality of email accounts 125, each including a plurality of respective email messages 180. In some embodiments, the network 170 can be a wide area network (WAN), a local area network (LAN), the internet, or an intranet. In some embodiments, the network 170 can be substantially similar to, or the same as, cloud computing environment 50 discussed with respect to FIG. 4.

Figure 2:
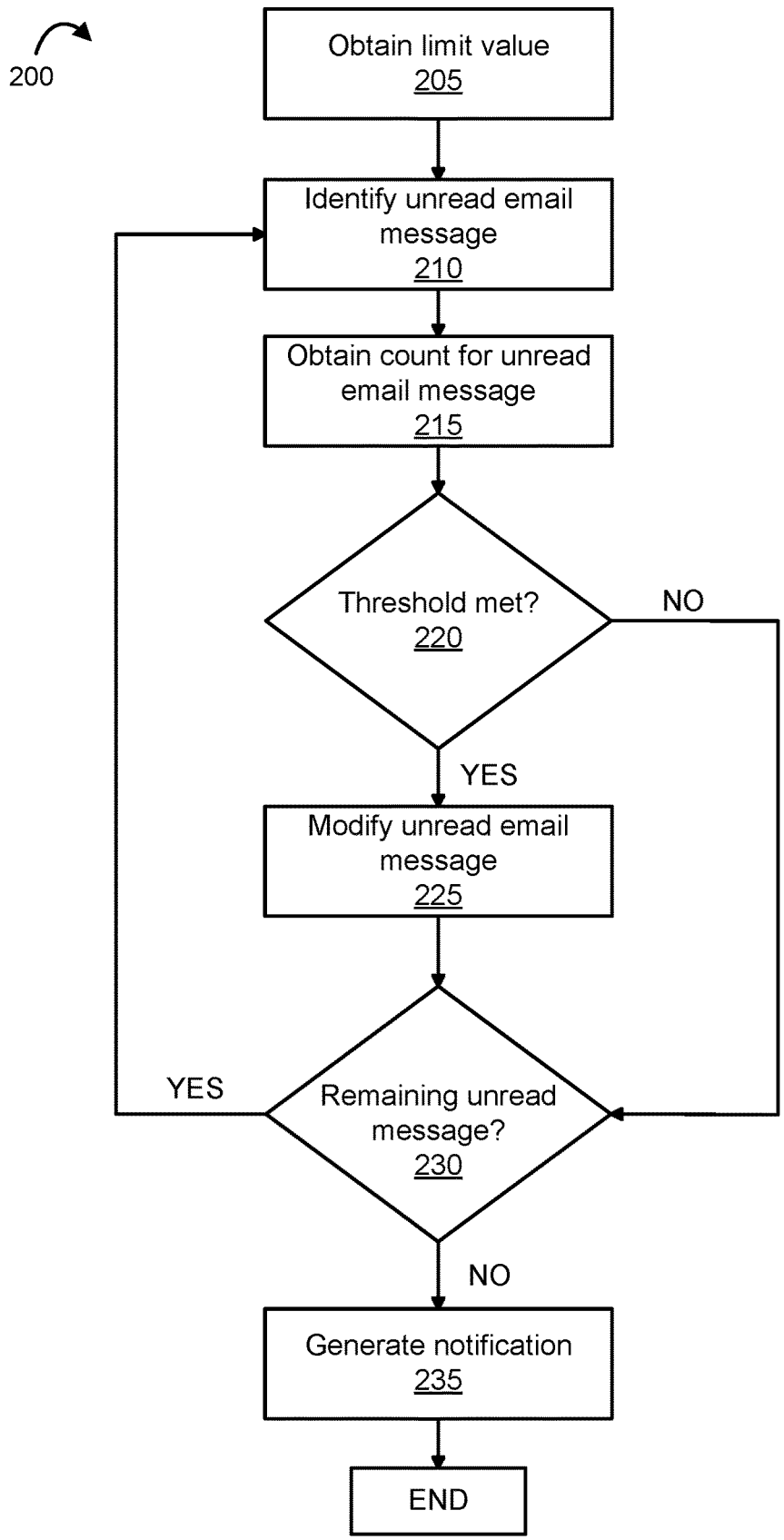
FIG. 2 depicts a flowchart of an example method for performing activity-based email message management, in accordance with embodiments of the present disclosure.

FIG. 2 illustrates a flowchart of an example method 200 for performing activity-based email management. Method 200 can be performed by an ABMS, such as the ABMS 130 discussed with respect to FIG. 1.

Turning back to FIG. 2, in operation 205, the ABMS can obtain a limit value corresponding to a number of times an email account is accessed. In some embodiments, a user can be said to access an email account when the user acquires the ability to view and manage email messages in response to logging in to the email account. Logging in to the email account can refer to submitting one or more credentials (e.g., username, password, and the like) to an entity (e.g., client and/or server) associated with the email account. Additionally, logging off of the email account can refer to terminating access to the email account such that a subsequent logging in to the email account is needed to regain access to the email account. A session can refer to a period of access to an email account. Thus, a session can begin in response to a logging in to an email account and the session can end in response to a corresponding logging off of the email account.

In an example, at a first time, a user can submit a username and password to an email server associated with an email account, then compose and send an email message from the email account, and then exit the email account. Continuing with this example, at a second time, subsequent to the first time, the user can re-submit the password to the email server, then review new messages within the mailbox of the email account, and then log off of the email account. In this example, the user has completed two log ins, two log offs, and two sessions.

Accordingly, in some embodiments, the limit value can correspond to a threshold number of sessions during which an email account is accessed. In some embodiments, the limit value can be a default value selected by an entity such as a network administrator, a company providing email services, or a programmer of the ABMS. In some embodiments, the limit value can be selected and/or modified by a user. As discussed in more detail below, the ABMS can determine whether to modify (e.g., move and/or delete) an unread email message based, in part, on the limit value. Accordingly, a selection of the limit value can permit an entity to tailor the ABMS's message management operations according to the entity's needs.

In operation 210, the ABMS can identify, among a set of email messages of an email account, an email message having an unread status. In some embodiments, an email message having an unread status can refer to the email message not being opened and/or not being read by a user who receives the email message in the user's email account. In some embodiments, operation 210 can include the ABMS obtaining an indication that the email message has the unread status. In some embodiments, such an indication can be included in metadata associated with the email message. In some embodiments, the ABMS can obtain such an indication from an email server and/or an email client associated with the corresponding email account.

In operation 215, the ABMS can obtain a count corresponding to a number of sessions where both during such sessions and after such sessions, the email message identified in operation 210 had the unread status. In some embodiments, operation 215 can include the ABMS generating such a count.

For example, as discussed above, a user can begin a first session by logging in to an email account. During the first session, the user can have 10 unopened email messages in the user's mailbox. Without opening any of those 10 email messages, the user can log off of the email account. In this scenario, the user completed one session. Furthermore, because they were not opened, each of the 10 unopened email messages had an unread status both during the first session and after the first session. Accordingly, the ABMS can assign an initial count of 1 to each of the 10 unopened email messages. Continuing with this example, the user can begin a second session by logging in to the email account a second time. During the second session, the user can have the same 10 unopened email messages in the user's mailbox. Also during the second session, the user can open 5 of those 10 unopened email messages, leaving 5 unopened email messages in the user's mailbox. The user can then log off of the email account. In this scenario, the user completed a total of two sessions. Furthermore, because they were still not opened, each of the 5 unopened email messages had an unread status both during the second session and after the second session. Accordingly, the ABMS can increase the count assigned to each of the 5 unopened email messages such that each has count of 2. Continuing with this example, the user can begin a third session by logging into the email account a third time. During the third session, the user can find 3 new email messages in addition to the 5 previously unopened email messages. In this example, the 3 new email messages were received in the user's mailbox after the second session. Without opening any of the 3 new email messages, and without opening any of the 5 previously unopened email messages, the user can log off of the email account. In this scenario, the user completed a total of three sessions. Furthermore, because they were still not opened, each of the 5 unopened email messages had an unread status both during the third session and after the third session. Accordingly, the ABMS can increase the count assigned to each of the 5 unopened email messages such that each has count of 3. In contrast, because each of the 3 new email messages was received after the second session, those messages did not have an unread status during the second session. Rather, the three new emails only had an unread status both during the third session and after the third session. Accordingly, the ABMS can assign an initial count of 1 to each of the 3 new email messages.

In some embodiments, operation 215 can include the ABMS storing and/or retrieving one or more counts associated with one or more unopened email messages. For example, in some embodiments, the ABMS can retrieve a stored count from a storage location (e.g., a memory) of a user device (e.g., user device 110, FIG. 1) or a server (e.g., server 160, FIG. 1). Next, the ABMS can increase the count as discussed above, and then store the increased count to a storage location. In some embodiments, the ABMS can store information corresponding to the counts discussed above in metadata associated with the one or more unopened email messages.

The count obtained in operation 215 can indicate a degree of priority to the user of an email message. For example, while a user may open a prioritized email message during a first session, the user may leave a less prioritized email message unopened after multiple sessions. Accordingly, as discussed below, embodiments of the present disclosure can modify such less prioritized email messages (e.g., email messages having a count that meets a threshold) in a manner that can improve the functionality and performance of email user interfaces and computing networks associated with email accounts.

In operation 220, the ABMS can compare the limit value obtained in operation 205 to the count obtained in operation 215 and determine whether a threshold is met. For example, in some embodiments, the threshold can include determining whether the count is equal to the limit value. In some embodiments, the threshold can include determining whether the count is greater than the limit value. In some embodiments, the threshold can be included in default criteria selected by an entity such as a network administrator, a company providing email services, or a programmer of the ABMS. In some embodiments, the threshold can be selected and/or modified by a user.

In operation 220, in response to determining that the threshold is met, the ABMS can proceed to operation 225. Alternatively, in response to determining that the threshold is not met, the ABMS can proceed to operation 230. Thus, in response to determining that the threshold is not met, the ABMS can refrain from modifying the email message having the count that did not meet the threshold. In some embodiments, operation 220 can include the ABMS generating and storing metadata corresponding to the unread email message whose count is analyzed in operation 220. In some embodiments, such metadata can include an indication corresponding to the threshold being met or not being met for such unread email message.

In operation 225, in response to determining that the threshold is met in operation 220, the ABMS can modify the email message having the count that met the threshold. In some embodiments, the modifying can include changing a storage location of the email message. For example, in some embodiments, the ABMS can modify the email message such that it is moved from a storage location on a server (e.g., server 160, FIG. 1) to a storage location on a user device (e.g., user device 110, FIG. 1). In these embodiments, the changed storage location can increase the storage capacity of the server and contribute to the server operating with improved efficiency. In some embodiments, the modifying can include deleting the email message. In these embodiments, such deleting can increase the storage capacity of one or more computing devices and permit such devices to operate with improved efficiency. In some embodiments, the modifying can include changing a visibility of the email message. For example, in some embodiments the email message can be modified such that it does not appear among listed messages on an email user interface (e.g., email user interface 120, FIG. 1). In some embodiments, such modifying can include removing the email message from a list of search results generated in response to a search (e.g., a keyword search) of a mailbox and/or email account in which the email message is included. In these embodiments, the visibility change can facilitate a user's ability to find and view email messages displayed on an email user interface, as the quantity of displayed email messages can be reduced.

In some embodiments, the modification to be performed in operation 225 can be included in default criteria selected by an entity such as a network administrator, a company providing email services, or a programmer of the ABMS. In some embodiments, the modification can be selected by a user.

In operation 230, the ABMS can determine whether the email account corresponding to the email message identified in operation 210 includes one or more additional email messages having the unread status. For example, in some embodiments, the ABMS can determine if the email account includes an unread email message whose count was not analyzed in operation 220. In some embodiments, operation 230 can include the ABMS obtaining an indication that the email account includes one or more additional messages having the unread status. In some embodiments, such an indication can be included in metadata associated with one or more email messages in the email account. In some embodiments, the ABMS can obtain such an indication from an email server and/or an email client associated with the email account. In some embodiments, the ABMS can determine such an additional email message based in part on metadata generated in operation 220. For example, in some embodiments, the ABMS can determine that a message having the unread status that is not associated with metadata generated in operation 220 can be such an additional email message.

In operation 230, in response to determining that the email account includes one or more additional email messages having the unread status, the ABMS can proceed to operation 210. In this way, the ABMS can perform operations 210-225 for each email in the email account having the unread status. Alternatively, in response to determining that the email account does not include one or more additional email messages having the unread status, the ABMS can proceed to operation 235.

In operation 235, in some embodiments, the ABMS can generate a notification corresponding to a modification performed in operation 225. For example, in embodiments in which a modification in operation 225 includes deleting an email message having an unread status, the ABMS can generate a notification, such as a text message to be transmitted to a user device (e.g., user device 110 FIG. 1) and/or to appear in an email user interface corresponding to an email account. Such a text message can indicate that the email message was deleted. In some embodiments, operation 235 can include the ABMS transmitting the notification to a user device and/or an email account. Following operation 235, method 200 can end.

Figure 3:
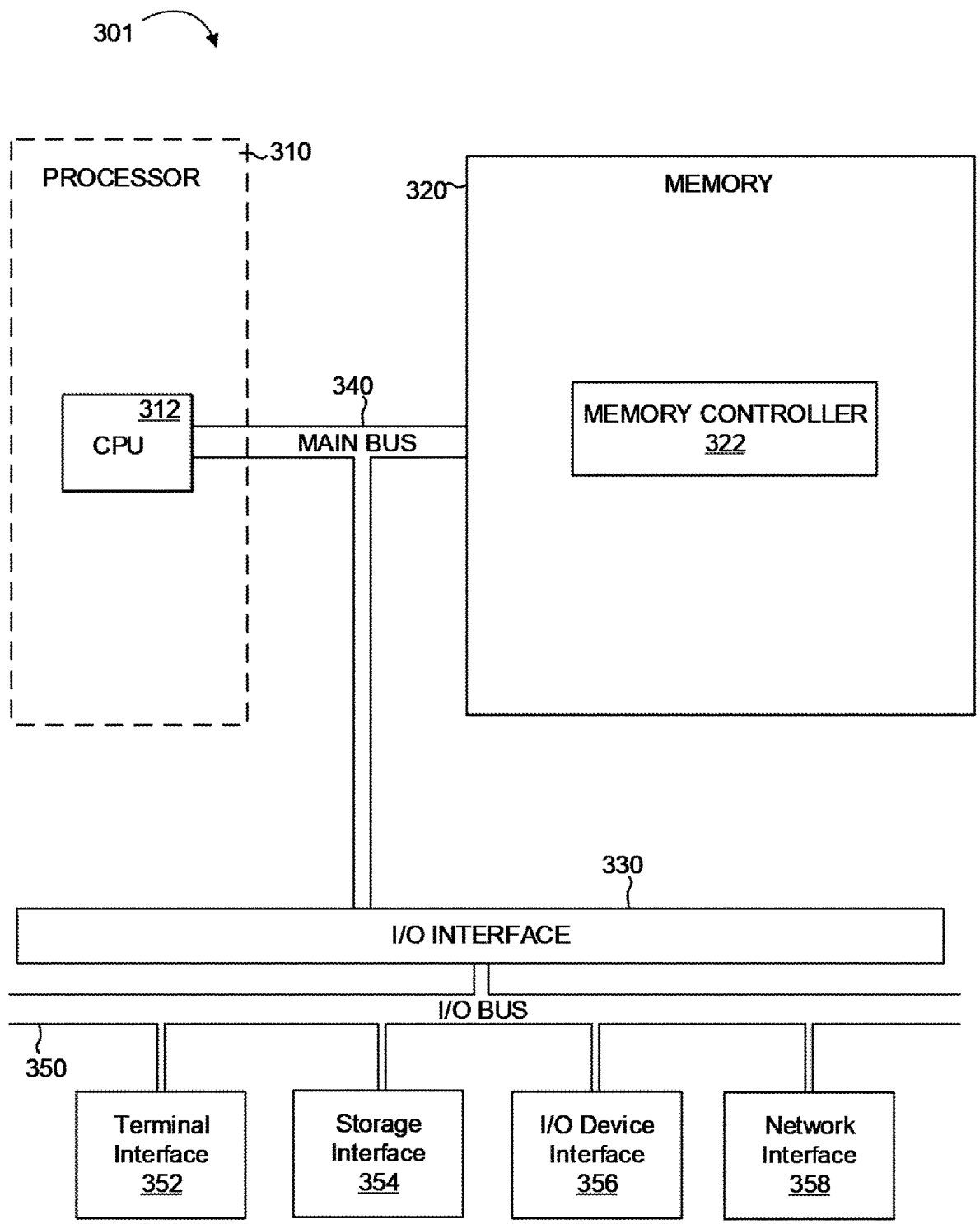
FIG. 3 depicts the representative major components of a computer system that can be used in accordance with embodiments of the present disclosure.

FIG. 3 depicts the representative major components of an exemplary Computer System 301 that can be used in accordance with embodiments of the present disclosure. The particular components depicted are presented for the purpose of example only and are not necessarily the only such variations. The Computer System 301 can comprise a Processor 310, Memory 320, an Input/Output Interface (also referred to herein as I/O or I/O Interface) 330, and a Main Bus 340. The Main Bus 340 can provide communication pathways for the other components of the Computer System 301. In some embodiments, the Main Bus 340 can connect to other components such as a specialized digital signal processor (not depicted).

The Processor 310 of the Computer System 301 can be comprised of one or more CPUs 312. The Processor 310 can additionally be comprised of one or more memory buffers or caches (not depicted) that provide temporary storage of instructions and data for the CPU 312. The CPU 312 can perform instructions on input provided from the caches or from the Memory 320 and output the result to caches or the Memory 320. The CPU 312 can be comprised of one or more circuits configured to perform one or methods consistent with embodiments of the present disclosure. In some embodiments, the Computer System 301 can contain multiple Processors 310 typical of a relatively large system. In other embodiments, however, the Computer System 301 can be a single processor with a singular CPU 312.

The Memory 320 of the Computer System 301 can be comprised of a Memory Controller 322 and one or more memory modules for temporarily or permanently storing data (not depicted). In some embodiments, the Memory 320 can comprise a random-access semiconductor memory, storage device, or storage medium (either volatile or non-volatile) for storing data and programs. The Memory Controller 322 can communicate with the Processor 310, facilitating storage and retrieval of information in the memory modules. The Memory Controller 322 can communicate with the I/O Interface 330, facilitating storage and retrieval of input or output in the memory modules. In some embodiments, the memory modules can be dual in-line memory modules.

The I/O Interface 330 can comprise an I/O Bus 350, a Terminal Interface 352, a Storage Interface 354, an I/O Device Interface 356, and a Network Interface 358. The I/O Interface 330 can connect the Main Bus 340 to the I/O Bus 350. The I/O Interface 330 can direct instructions and data from the Processor 310 and Memory 320 to the various interfaces of the I/O Bus 350. The I/O Interface 330 can also direct instructions and data from the various interfaces of the I/O Bus 350 to the Processor 310 and Memory 320. The various interfaces can comprise the Terminal Interface 352, the Storage Interface 354, the I/O Device Interface 356, and the Network Interface 358. In some embodiments, the various interfaces can comprise a subset of the aforementioned interfaces (e.g., an embedded computer system in an industrial application may not include the Terminal Interface 352 and the Storage Interface 354).

Logic modules throughout the Computer System 301—including but not limited to the Memory 320, the Processor 310, and the I/O Interface 330—can communicate failures and changes to one or more components to a hypervisor or operating system (not depicted). The hypervisor or the operating system can allocate the various resources available in the Computer System 301 and track the location of data in Memory 320 and of processes assigned to various CPUs 312. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
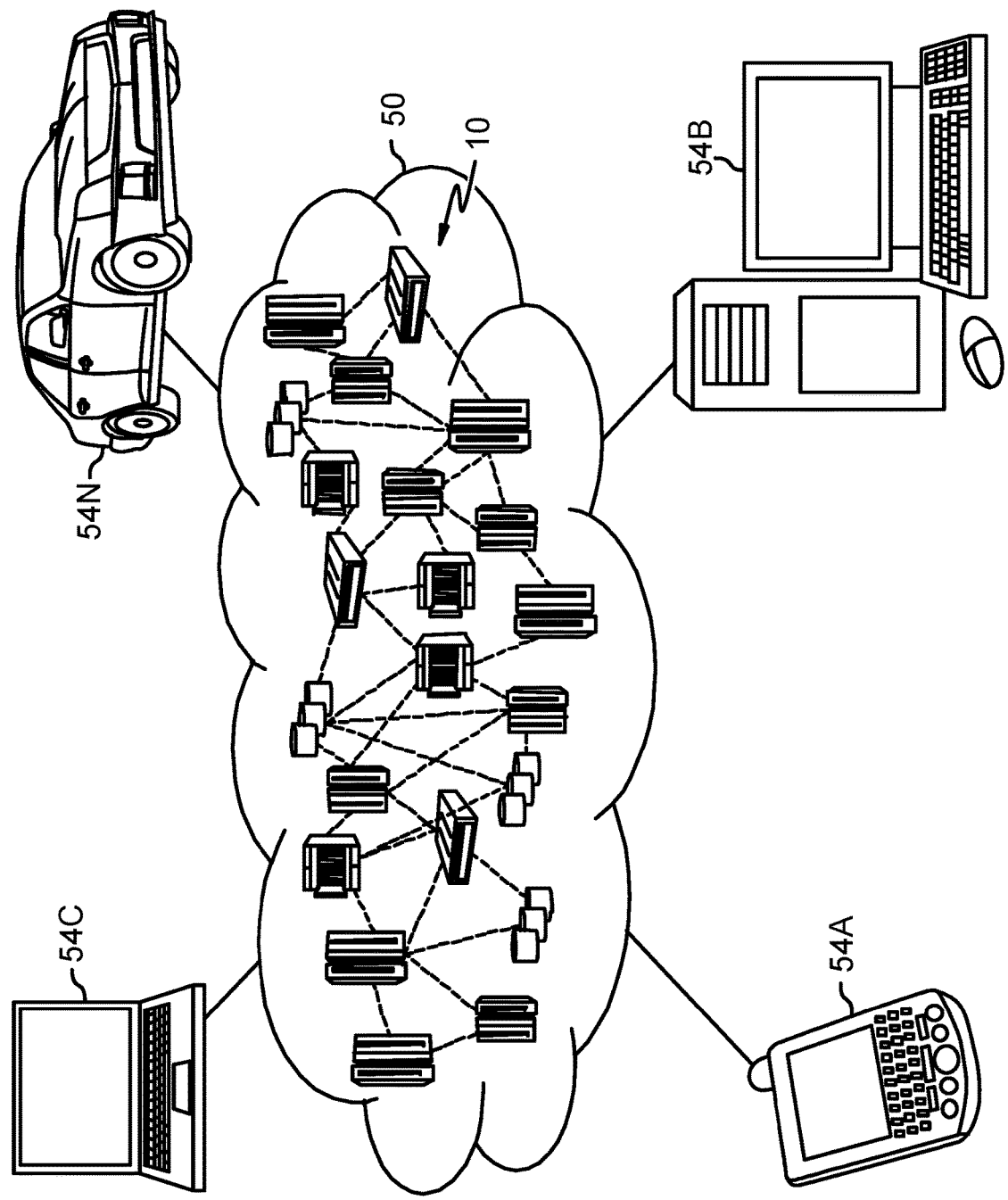
FIG. 4 depicts a cloud computing environment according to embodiments of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
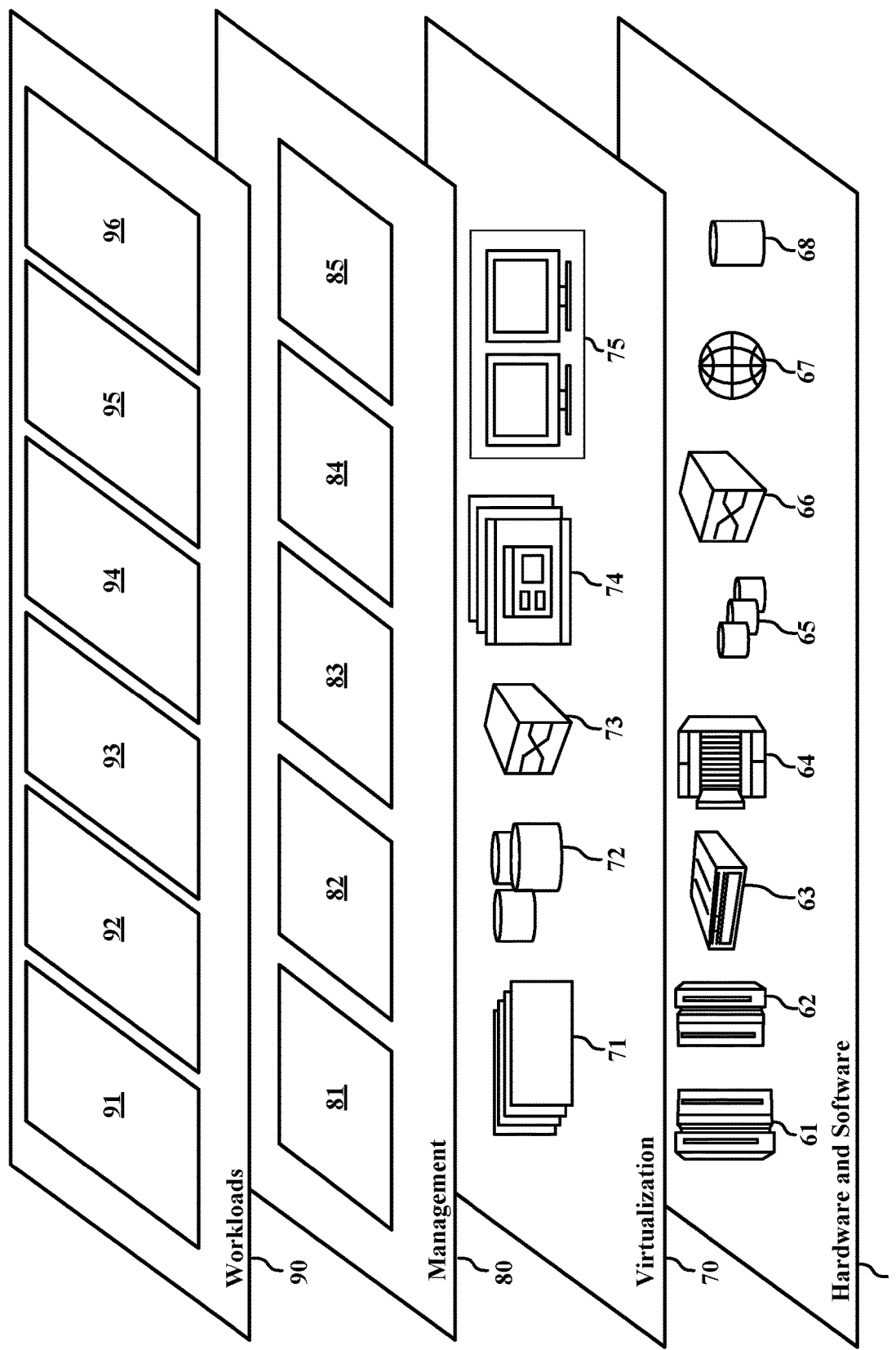
FIG. 5 depicts abstraction model layers according to embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and activity-based management logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining a limit value corresponding to a number of times an email account is accessed, the email account comprising a set of email messages;
   identifying a first email message of the set of email messages, the first email message having an unread status;
   obtaining, for the first email message, a first count of one or more first sessions, the first email message having the unread status both during the one or more first sessions and after the one or more first sessions;
   comparing the limit value to the first count;
   determining, based on the comparing, that a threshold is met; and
   modifying the first email message in response to the determining that the threshold is met.

2. The computer-implemented method of claim 1, wherein the determining that the threshold is met comprises determining that the first count is equal to the limit value.

3. The computer-implemented method of claim 1, wherein the determining that the threshold is met comprises determining that the first count is greater than the limit value.

4. The computer-implemented method of claim 1, wherein the modifying comprises changing a storage location of the first email message.

5. The computer-implemented method of claim 4, wherein the modifying comprises deleting the first email message.

6. The computer-implemented method of claim 1, wherein the modifying comprises changing a visibility of the first email message.

7. The computer-implemented method of claim 1, further comprising:
   identifying a second email message of the set of email messages, the second email message having the unread status;
   obtaining, for the second email message, a second count of one or more second sessions, the second email message having the unread status both during the one or more second sessions and after the one or more second sessions;
   comparing the limit value to the second count;
   determining, based on the comparing, that the threshold is not met; and
   refraining from modifying the second email message in response to the determining that the threshold is not met.

8. The computer-implemented method of claim 1, further comprising:
   generating a notification indicating the modifying the first email message.

9. A system comprising:
   one or more processors; and
   one or more computer-readable storage media storing program instructions which, when executed by the one or more processors, are configured to cause the one or more processors to perform a method comprising:
      obtaining a limit value corresponding to a number of times an email account is accessed, the email account comprising a set of email messages;
      identifying a first email message of the set of email messages, the first email message having an unread status;
      obtaining, for the first email message, a first count of one or more first sessions, the first email message having the unread status both during the one or more first sessions and after the one or more first sessions;
      comparing the limit value to the first count;
      determining, based on the comparing, that a threshold is met; and
      modifying the first email message in response to the determining that the threshold is met.

10. The system of claim 9, wherein the determining that the threshold is met comprises determining that the first count is equal to the limit value.

11. The system of claim 9, wherein the modifying comprises changing a storage location of the first email message.

12. The system of claim 11, wherein the modifying comprises deleting the first email message.

13. The system of claim 9, wherein the modifying comprises changing a visibility of the first email message.

14. The system of claim 9, the method further comprising:
    identifying a second email message of the set of email messages, the second email message having the unread status;
    obtaining, for the second email message, a second count of one or more second sessions, the second email message having the unread status both during the one or more second sessions and after the one or more second sessions;
    comparing the limit value to the second count;
    determining, based on the comparing, that the threshold is not met; and
    refraining from modifying the second email message in response to the determining that the threshold is not met.

15. The system of claim 9, the method further comprising:
    generating a notification indicating the modifying the first email message.

16. A computer program product comprising one or more computer readable storage media, and program instructions collectively stored on the one or more computer readable storage media, the program instructions executable by one or more processors to cause the one or more processors to perform a method comprising:
    obtaining a limit value corresponding to a number of times an email account is accessed, the email account comprising a set of email messages;
    identifying a first email message of the set of email messages, the first email message having an unread status;
    obtaining, for the first email message, a first count of one or more first sessions, the first email message having the unread status both during the one or more first sessions and after the one or more first sessions;
    comparing the limit value to the first count;
    determining, based on the comparing, that a threshold is met; and
    modifying the first email message in response to the determining that the threshold is met.

17. The computer program product of claim 16, wherein the determining that the threshold is met comprises determining that the first count is equal to the limit value.

18. The computer program product of claim 16, wherein the modifying comprises changing a storage location of the first email message.

19. The computer program product of claim 18, wherein the modifying comprises deleting the first email message.

20. The computer program product of claim 16, the method further comprising:
- identifying a second email message of the set of email messages, the second email message having the unread status;
- obtaining, for the second email message, a second count of one or more second sessions, the second email message having the unread status both during the one or more second sessions and after the one or more second sessions;
- comparing the limit value to the second count;
- determining, based on the comparing, that the threshold is not met; and
- refraining from modifying the second email message in response to the determining that the threshold is not met.

\* \* \* \* \*